3,555,502
AERIAL DROP TELEMETERING SENSOR
Paul D. Davis, Jr., Garland, and Edwin B. Neitzel, Dallas, Tex., assignors to Texas Instruments Incorporated, Dallas, Tex.
Filed Feb. 12, 1969, Ser. No. 798,730
Int. Cl. G01v 1/12, 1/14, 1/16
U.S. Cl. 340—15.5                                    6 Claims

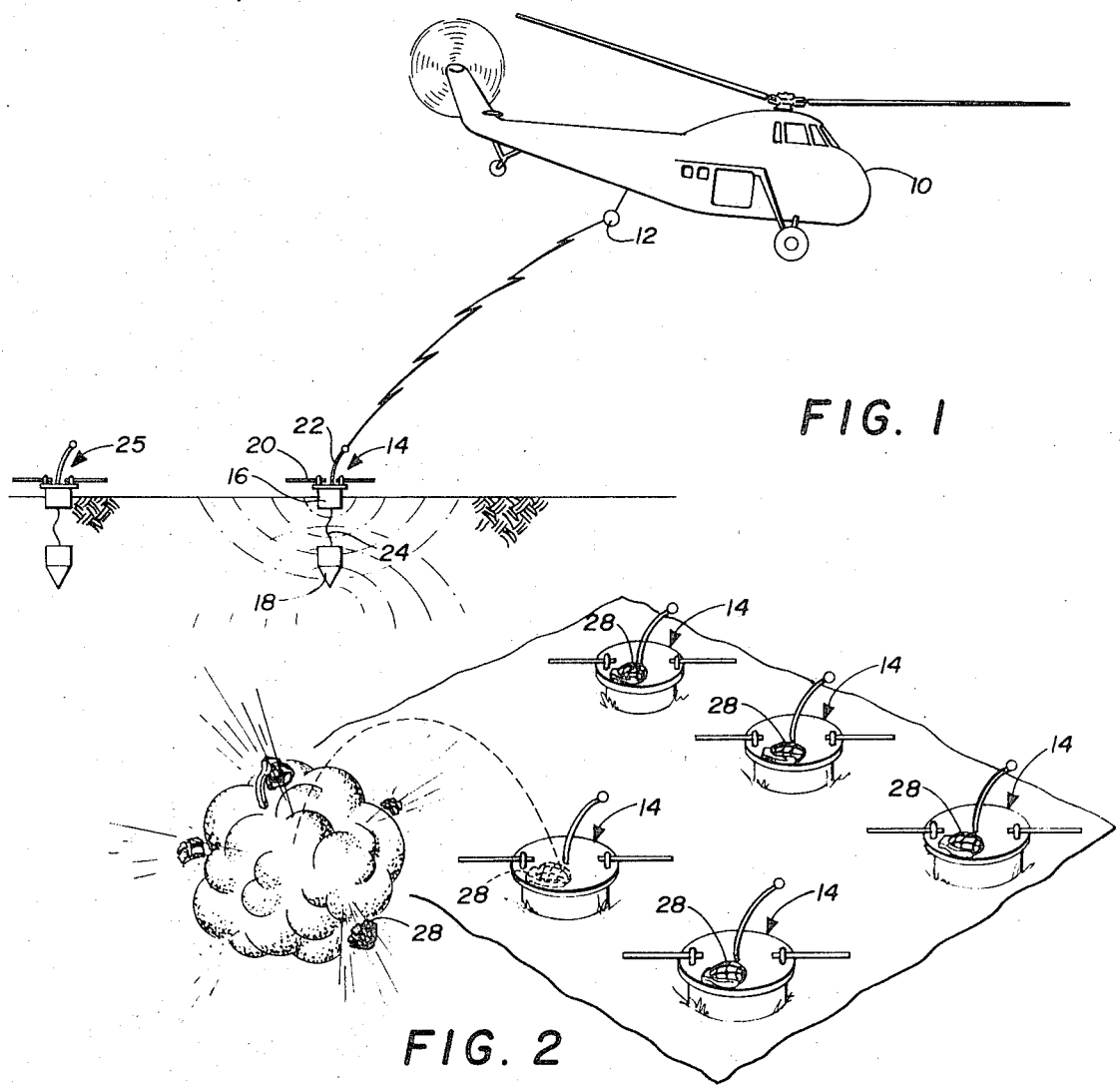
FIG. 1
FIG. 2
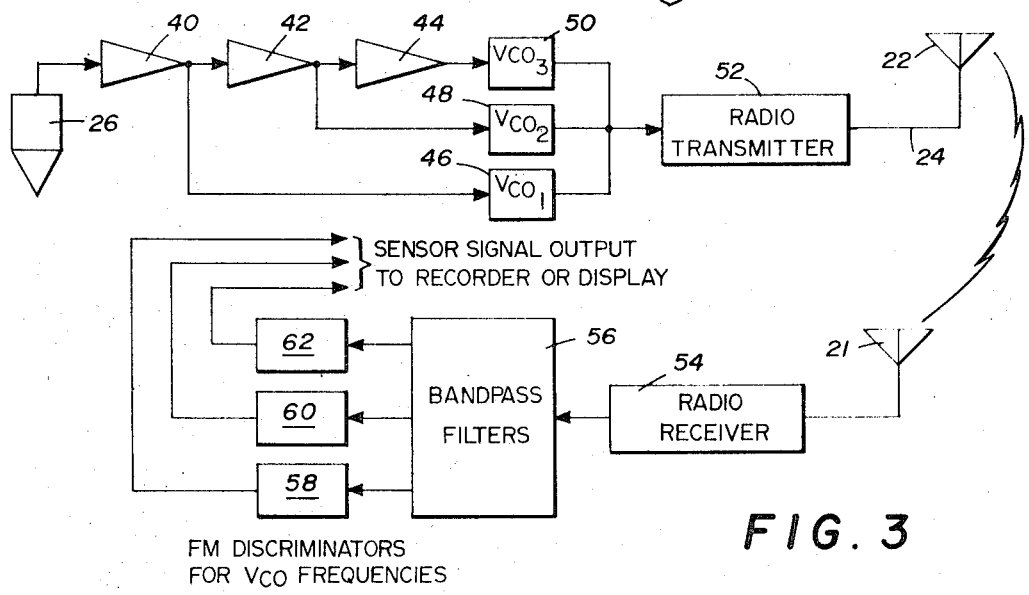
FIG. 3

United States Patent Office 3,555,502
Patented Jan. 12, 1971

ABSTRACT OF THE DISCLOSURE

Preliminary seismic exploration and exploration in remote access areas may be carried out with a low-cost, expendable seismic telemetering unit contained in a two-part air-droppable probe that includes an upper section (light mass) designed to remain at the surface and a lower section (heavy mass) that is buried to a depth depending upon the soil conditions. As the two-part probe embeds itself in an earth-like surface, it generates underground seismic waves, thereby acting as its own source of seismic energy. Many probes may be dropped in an exploration area in any desired spread to produce the desired seismic data. The impact of each probe generates a new set of energy waves that will be picked up by all earlier dropped probes. By appropriate coding of the transmitted energy, an airborne computer will segregate the signals from each probe to produce seismic data that may be read in the usual manner. Seismic waves are detected by a seismic sensor in the lower section (sensor section) which generates electrical signals proportional to the traveling waves. These electrical signals are amplified by one of many different amplification systems, depending on the application, and converted into radio frequency signals in a radio transmitter. An antenna is mounted to extend above the earth's surface as a communication link between the radio transmitter and a radio receiver operating at a remote location.

---

Figure 4:
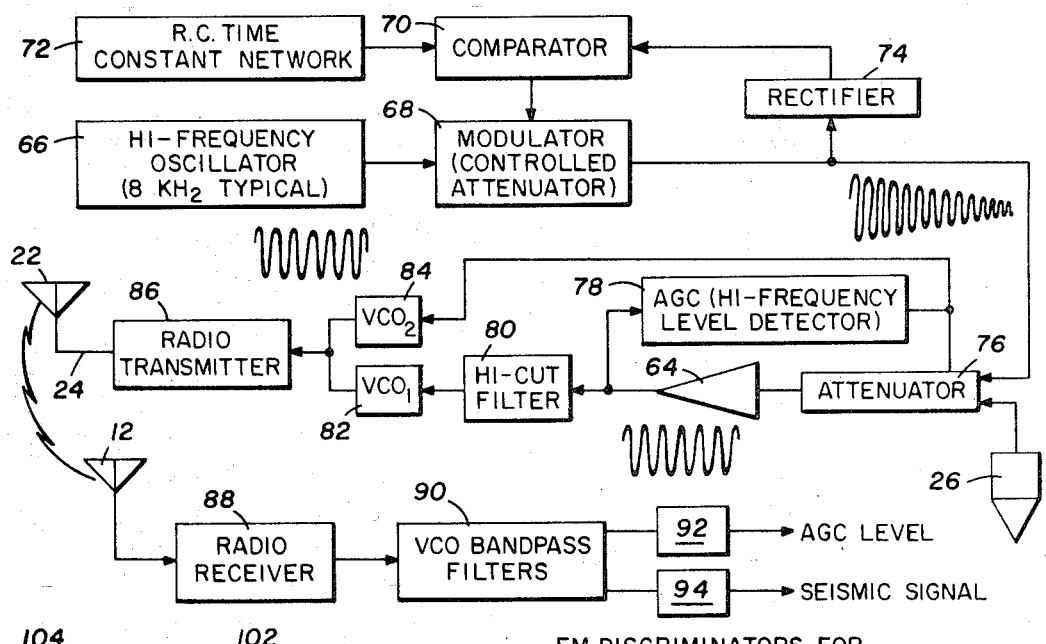

This invention relates to seismic exploration, and more particularly to a method of seismic exploration by means of an air-droppable telemetering sensor for use in remotely obtaining seismic reflection and refraction data.

Heretofore, seismic exploration by means of air-droppable probes employed a separate energy source to generate the underground traveling waves. In these earlier air-drop methods of seismic exploration, the individual seismometers were dropped from an aircraft in a desired spread covering the area to be investigated. After the entire spread was laid out, an explosive charge was dropped and detonated upon impact or upon a signal from the aircraft. Coincident with the detonation of the explosive charge, processing equipment in the aircraft was energized to record the energy transmitted from the individual seismometers of the complete spread.

One earlier device for picking up sound vibrations which are transmitted through the ground includes a hollow, somewhat cylindrically-shaped housing terminating at the lower end in a spike-like tip and having an antenna extending from the opposite end. The spike penetrates the ground and acoustically couples the housing to the earth. An electro-acoustic transducer in the housing picks up underground vibrations and converts them to electrical signals which are coupled to a modular amplifier and self-contained radio transmitter.

The shortcoming with this and other similar devices is that upon impact there is no assurance that the antenna will remain above ground. When the entire unit is buried such that the antenna does not extend above ground, no transmission of the sound vibrations can be made.

An object of the present invention is to provide a method of seismic exploration by remotely obtaining seismic reflection and refraction data. Another object of the present invention is to provide a method of seismic exploration by means of a low-cost, expendable seismic telemetering unit. A further object of the present invention is to provide a method of seismic exploration by means of an air-droppable telemetering sensor that responds to its own energy waves. Still another object of the present invention is to provide a two-part aerial drop telemetering sensor with a transmitting antenna in a section that remains at the earth's surface.

A typical sensor for practicing the present invention comprises a separable two-part probe including an antenna section that remains at the earth's surface and a sensor section that separates from the antenna section as the probe embeds itself in the earth. Upon separation from the antenna section, the sensor section burrows to a depth determined by the soil conditions. The antenna section contains an antenna extending above the earth's surface that connects by a flexible line to a radio transmitter in the sensor section that produces radio frequency signals for transmission from the antenna to a radio receiver. Radio frequency signals produced by the radio transmitter contain information relating to subsurface structure which is gathered by a seismic sensor responsive to underground traveling waves. The seismic sensor produces electrical signals which are amplified in one of several amplification systems (depending upon the application). Amplified signals from the amplification system are connected to the radio transmitter to modulate a radio frequency. Amplification systems that may be used are: split level amplification to provide wide dynamic range; programmed gain control where gain varies with time; or one of several binary gain control systems when the gain of an amplifier is controlled by binary logic.

A more complete understanding of the invention and its advantages will be apparent from the specification and claims and from the accompanying drawings illustrative of the invention.

Figure 5:
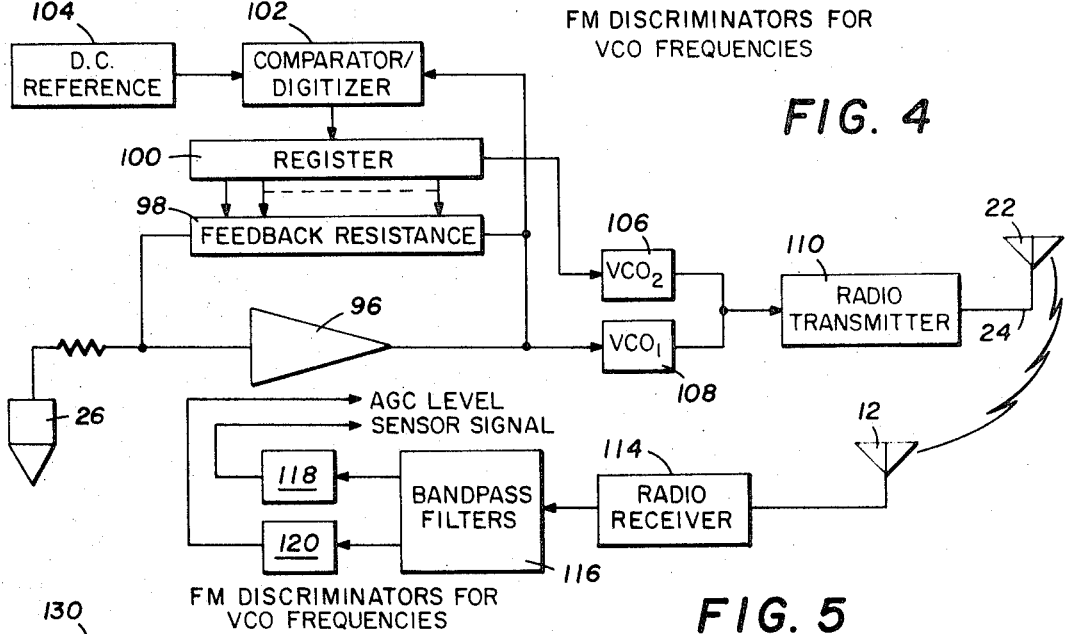
Figure 6:
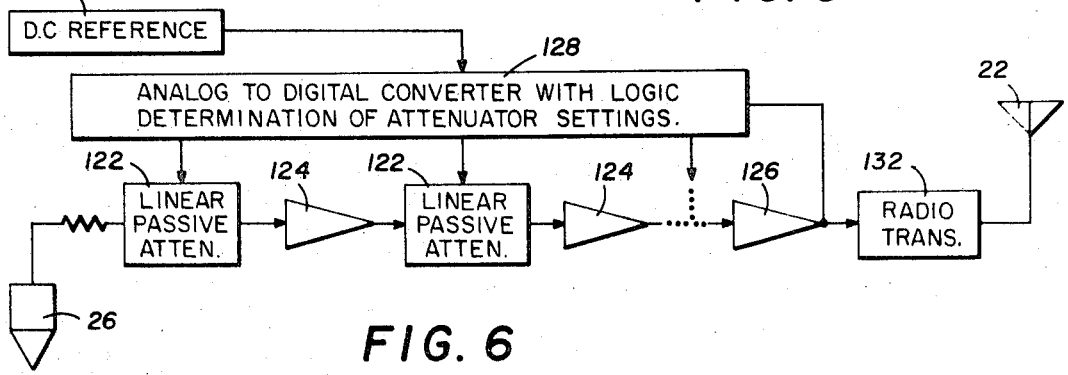

Referring to the drawings:
FIG. 1 is an illustration of remote seismic exploration with a helicopter and employing a two-part, low-cost, expendable probe;
FIG. 2 is an illustration of a spread of expendable probes each carrying a grenade as a source of seismic energy;
FIG. 3 is a block diagram of a seismic telemetering and receiving system with split-level gain to provide wide dynamic range;
FIG. 4 is a block diagram of a seismic transmitting and receiving system for an air-droppable probe with programmed gain control;
FIG. 5 is a block diagram of a seismic transmitting and receiving system for an air-droppable probe with binary logic gain control; and
FIG. 6 is a block diagram of another seismic transmitting system for an air-droppable probe with binary logic gain control.

Referring to the drawings, FIG. 1 shows a helicopter 10 (fixed wing aircraft may be used) having an antenna 12 mounted to the fuselage and connected to a radio receiver and other seismic signal processing circuitry for rapidly displaying or recording seismic waves transmitted over a radio frequency channel from a probe 14. The probe 14 was previously dropped from the helicopter 10 with the antenna section 16 and the sensor section 18 combined as a single unit. Upon impact, the probe 14 began to embed itself into the earth's surface and the sensor section 18 separated from the antenna section 16. The antenna section 16 (a light mass) remains partially above the earth's surface, while the sensor section 18 (heavy mass) penetrated into the earth for a depth dependent upon soil conditions. With the antenna section 16 partially above the earth's surface, a ground plane 20 and associated whip antenna 22 extend above ground level in a position to establish a communications link with the antenna 12. Other types of antennas, such as ½ wave, center fed dipole or ¼ wave ring, could be used instead of the ground plane type. As the sensor section 18 penetrates into the earth, a payout lead 24 uncoils from the antenna section 16 to maintain an electrical connection between circuitry in the sensor section and the antenna 22.

The impact of the probe 14 causes underground vibrations which are transmitted to and reflected from subsurface strata. These underground waves impinge on the sensor section 18 and the previously implanted sensor section 25, both of which contain a seismometer capable of surviving and operating normally after impact. For low altitude drops and/or soft soil conditions, the probes may carry a grenade or other economical source of seismic impulse energy that ejects upon impact or on command from the helicopter 10 to produce the underground vibrations. It should be noted, that the seismometer in the sensor section 18 is not limited to detecting and handling subsurface profile seismic data. Other types of seismic signals, such as those created at the surface by wind, personnel movement, vehicular movement, or other sources of disturbance, may also be detected.

To explore subsurface strata with the two-part expendable probes illustrated in FIG. 1 for a fast survey or a survey in remote, inaccessible areas, the probe 25 is dropped from the helicopter 10. The impact of the probe 25 generates seismic waves which propagate to and reflect from subsurface strata. The sensor section picks up the reflected waves and converts them to a radio frequency signal transmitted through an antenna to the antenna 12 of the helicopter 10. Seismic processing equipment aboard the helicopter 10, which may include a computer, receives the transmitted data and records it in the usual manner. A second probe 14 is dropped from the helicopter 10 and upon impact a second set of underground energy waves will be generated. By appropriately spacing the time between the impact of two probes, the energy generated by the first will be dissipated before waves generated by the second probe begin. Underground waves produced by the second probe will be again reflected from subsurface strata. Now, however, the sensor sections for both probes 14 and 25 will convert the underground waves into radio frequency signals transmitted to the antenna 12. The radio frequency signals produced by both probes will be converted into standard seismic data by the processing circuitry aboard the helicopter 10 and recorded in the usual manner.

There are a number of techniques used for distinguishing the signals transmitted from different probes. In one technique, each probe transmits at a separate frequency which is detected and separated by the seismic processing circuitry aboard the helicopter 10. In another technique, each probe stores the seismic signals generated by the sensor section. Upon receiving a transmission-keying signal from the helicopter 10, the stored data is transmitted to the antenna 12. After the data from one probe has been received and processed, the next probe is keyed to transmit its stored data.

Additional probes may be dropped from the helicopter 10 to make as complete a survey of a given region as desired. The impact of each probe acts as another source of seismic energy to set up additional traveling waves to produce reflection and refraction data. The location of each probe may be accurately located by determining the position of the helicopter 10 when a probe is dropped therefrom. Since each probe generates additional seismic waves, common depth-point data will be produced by seismic exploration in accordance with this invention.

As mentioned previously, in certain soft soil conditions, a grenade or other explosive device may be carried by the probe 10. Upon impact, or upon a signal from the helicopter 10, this grenade would be ejected from the probe and detonated, thereby generating underground seismic waves. Referring to FIG. 2, there is shown a spread of probes 14 each carrying a grenade 28. If each probe ejects its grenade upon impact, the same method of seismic exploration would be carried out as described above. Alternatively, a spread of probes may be deployed from the helicopter 10 and then the individual grenades ejected upon a command from the helicopter. Again, the time delay between detonation of the individual grenades would be selected to insure dissipation of previously generated underground energy before generating new waves. As an alternative, only one probe of the spread is equipped with a grenade that would be ejected and detonated after the entire spread had been formed. Of course, any number of grenades could be employed, depending on the type of survey being carried out.

Referring to FIG. 3, there is shown an air-droppable seismic telemetering system, and a receiving and processing network carried by the helicopter 10. In some applications, signal voltages from the sensor 26 may have a dynamic range considerably larger than the data handling equipment (transmission and/or recording system) is able to handle with out distortions. For example, input signal levels out of the seismic sensor 26 may vary from $10^{-6}$ to $10^{-1}$ volts, a ratio of 100,000 to 1, or a 100 db dynamic range. Most data handling equipment, however, has a dynamic range limited to only about 40 db maximum.

With the system of FIG. 3, a 100 db dynamic range of signals is divided into several levels (split level amplification) for handling in a transmission and recording system having a 40 db range. A signal from the seismic sensor 26 is coupled to the input of an amplifier 40 in casecade with amplifiers 42 and 44. The ouput of the amplifier 40 is coupled to the input of the amplifier 42 and the input of a voltage control oscillator (VCO) 46. An output signal from the amplifier 42 is connected to the input of the amplifier 44 and the input of a voltage control oscillator 48. Finally, the output of the amplifier 44 is connected to the input of a voltage control oscillator 50. The voltage control oscillators 46, 48, and 50 are interconnected to the input of a radio transmitter 52. The output of the radio transmitter 52 is tied to the antenna 22 through the payout line 24.

A signal from the seismic sensor 26 will be amplified to three levels by the amplifiers 40, 42, and 44. Each of the voltage control oscillators 46, 48 and 50 is frequency modulated by the amplified sensor signal from the respective amplifier. Typically, a voltage control oscillator responds to an input modulation voltage maximum of five volts. For strong signals from the seismic sensor 26, the output of the amplifier 40 is sufficient to drive the voltage control oscillator 46. When the underground waves to the sensor 26 reduce in intensity to an intermediate level, the output of the amplifier 42 is sufficient to drive the voltage control oscillator 48. However, in this intermediate range, the output of the amplifier 40 has decayed to a level insufficient to drive the oscillator 46. For the weakest signals generated by the seismometer 26, only the output of the amplifier 44 will be sufficient to drive a voltage control oscillator. Consequently, the VCO 50 which responds to sensor signals amplified by all three amplifiers 40, 42, and 44 must "carry" the lowest 40 db range level signals of interest.

If the weakest signals of interest are $10^{-6}$ volts, then the voltage control oscillator 50 is frequency modulated by seismic signals in the range of from $10^{-6}$ to $10^{-4}$ volts (a 40 db range). The total gain of the amplifiers 40, 42, and 44 must be 50 times. If the radio transmitter 52 has a 40 db range, and if the strongest seismic signal is $10^{-1}$ volts, the voltage control oscillator 46 will be capable of handling input signals in the range of from $10^{-1}$ to $10^{-3}$ volts. The difference between the range of signals handled by the oscillator 46 and the oscillator 50 must be taken care of in the oscillator 48. This means a range of signals from $10^{-4}$ to $10^{-3}$ volts (20 db). This, of course, does not make use of the total 40 db dynamic range capability of the transmitter 52. A desirable arrangement is to have the voltage control oscillator 48 operate over a range that overlaps the ranges of the oscillators 46 and 50. A 10 db overlap means that the maximum sensor signal the oscillator 48 is to handle would be $10^{-3}$ volts.

In summary, three overlapping levels of amplification of the sensor signals frequency modulate three 40 db dynamic range voltage control oscillators 46, 48 and 50. In turn the oscillators 46, 48, and 50 modulate a single radio transmitter 52 to provide a method for transmitting an overall dynamic range of 100 db of sensor signals over a single radio frequency carrier. The RF signal from the antenna 22 is received by the antenna 12 of the helicopter 10. A radio register 54, coupled to the antenna 12, passes the RF signal to a conventional bandpass filter 56. The filter 56 separates the RF signal into the three dynamic ranges detected by the voltage controlled oscillators 46, 48 and 50. Each range of signals passes through separate FM discriminators 58, 60 or 62 wherein the three levels of sensor signals are recovered and sent to a recorder and/or display (not shown).

In seismic exploration work, it is inherent that the reflection signals resulting from the nearest discontinuities in the earth's structure will be the largest and earliest received. Consequently, by using a sensor signal amplifier whose gain varies with time, it is possible to handle, without overload distortion, a wide dynamic range of signals.

Referring to FIG. 4, there is shown a programmed gain controlled telemetering system for an air-droppable probe. Basically, the gain of a signal amplifier 64 is varied in time by a high frequency signal whose amplitude varies with time. A high frequency oscillator 66 generates a constant amplitude high frequency signal (typically 8 kHz.) which connects to an amplitude modulator 68. The amplitude modulator 68 varies the amplitude of the high frequency signal from the oscillator 66 in accordance with a signal from a comparator 70. The comparator 70 compares a slowly varying D.C. bias voltage generated by a R-C time constant network 72 with the output of a rectifier 74, connected to the output of the modulator 68. Time varying high frequency signals from the modulator 68 and the low frequency signals from the seismic sensor 26 are connected as inputs to a controllable attenuator 76. The output of the attenuator 76 is the input to the signal amplifier 64. Both the high frequency signal from the modulator 68 and the low frequency seismic signal are amplified simultaneously in the signal amplifier 64. An automatic gain control circuit 78 detects the amplified high frequency signal and produces an output which sets the value of the attenuator factor for the attenuator 76. As the level of the AGC signal decreases, the attenuation decreases, and the gain of the amplifier increases. Thus, early arrival, large amplitude sensor signals are amplified a relatively small amount compared to the amplification of later, smaller signals.

At the output of the signal amplifier 64, a low-pass filter 80 removes all A.C. bias signals and passes the low frequency seismic signals to a voltage controlled oscillator 82. Low frequency sensor signals from the filter 80 frequency modulates a subcarrier frequency in the oscillator 82. In addition, the AGC attenuator control signal from the circuit 78 frequency modulates a subcarrier frequency in a voltage control oscillator 84. The output of the voltage control oscillators 82 and 84 are combined and connected as the input to a radio transmitter 86. The two voltage control oscillator outputs modulate the radio transmitter frequency to produce a single RF signal connected to the antenna 22 through the line 24 containing both the seismic data and the amplifier gain.

In the helicopter 10, the antenna 12 receives the signal transmitted from the antenna 22 and passes it through a radio receiver 88. The radio receiver 88 detects the transmitter RF signal and passes both the seismic signal and the AGC signal to bandpass filters 90. Bandpass filters separate the sensor signal from the AGC signal and pass both through respective FM discriminators 92 and 94.

Referring to FIG. 5, there is shown another telemetering sensor system for use with an air-droppable probe. In this system, the gain of a signal amplifier 96 changes in steps to accommodate a wide range of sensor signals. The amplifier 96 is of an operational type whose gain varies by changing the amount of resistance in a feedback network 98 coupled between the output and the input of the amplifier. The value of the resistance in the feedback network for the amplifier 96 is controlled in accordance with binary logic from a register 100. Thus, this system is commonly identified as a "binary gain control telemetering unit." To establish the binary code in the register 100, the output signal of the amplifier 96 is constantly monitored by a comparator/digitizer 102 which converts the amplifier output to a D.C. voltage for comparison to a D.C. reference voltage from a reference source 104. The digital register 100 operates through diode switching logic to adjust the value of feedback resistance in the network 98. Feedback network 98 may take the form of a series, or ladder network, of resistors. As the output of the amplifier 96 changes, the comparator/digitizer 102 changes the binary code in discrete steps which in turn changes the feedback resistance of the network and varies the gain of the amplifier. Thus, the amplifier 96 receives an input seismic signal from the seismic sensor 26 and products an output signal at a nearly constant magnitude, although the seismic signals decay with time.

It is standard practice in seismic exploration that both the gain control factor and the seismic signal are recorded for each exploration. For a system of FIG. 5, the D.C. feedback voltage from the network 98 is a representation of the gain of the amplifier 96. This AGC signal modulates a subcarrier frequency of a voltage controlled oscillator 106. Similarly, the output of the amplifier 96 modulates a subcarrier frequency of a voltage controlled oscillator 108. Outputs from the oscillators 106 and 108 are combined to modulate an RF frequency in a radio transmitter 110 to produce a single RF signal coupled to the antenna 22 through the payout line 24.

At the helicopter 10, the AGC and seismic signals are received by the antenna 12. These signals are detected by a radio receiver 114 in a system that includes a bandpass filter 116 and FM discriminators 118 and 120. The receiving and processing system of FIG. 5 operates in the same manner as the receiving and processing system illustrated in FIG. 4.

Referring to FIG. 6, there is shown an alternate system for telemetering seismic data from an air-droppable probe employing binary gain ranging. Seismic signals from the sensor 26 pass through the first of a series of controllable linear passive attenuators 122. Between each of the linear attenuators 122 there is connected a signal amplifier 124. A signal amplifier 126 amplifies the signal passed through the last attenuator in the series. Although only two linear attenuators have been shown, a complete system may include more. A logic control system 128 constantly monitors the output of the amplifier 126 for comparison with a standard D.C. voltage from a reference source 130. The logic network 128 includes an analog digital converter and a series of digital registers, one for each linear passive attenuator. Each of the registers in the network 128 establishes a binary code for controlling the linear attenuator connected thereto. Typically, if the output signal from the amplifier 126 is 75% of the D.C. reference voltage, binary codes are generated for each of the linear passive attenuators 122 to increase the attenuation factor by 6 db. If the signal level at the output of the amplifier 126 is below 25% of the reference voltage, the logic network 128 generates binary codes to decrease the attenuator factor by 6 db. Thus, as the seismic signal produced by the sensor 26 decays with time, the linear attenuators are varied to maintain a reasonably constant output for the amplifier 126. The output of the amplifier 126 modulates an RF frequency in a radio transmitter 132 which produces an RF signal for transmission from the antenna 22.

While the several embodiments, together with modifications thereof, have been described in detail herein and shown in the accompanying drawings, it will be evident that various further modifications are possible without departing from the scope of the invention as set forth in the appended claims.

What is claimed is:

1. A method of seismic exploration, the steps comprising:
   generating seismic waves by the impact of an air-droppable seismometer probe with the earth's surface in a survey area,
   receiving at the seismometer the seismic waves generated by the impact energy and reflected from subface strata, and
   converting the seismic energy at the seismometer into a radio frequency signal for transmission to a remote receiver.

2. A method of seismic exploration as set forth in claim 1 including the step of converting the radio frequency signal at the remote receiver into seismic reflection and refraction data.

3. A method of seismic exploration as set forth in claim 1 including the steps of:
   generating additional seismic waves by the impact of additional air-droppable seismometer probes with the earth's surface in the survey area, and
   receiving at each seismometer probe the seismic waves generated by the impact energy of subsequently implanted probes and reflected from subsurface strata.

4. A method of seismic exploration as set forth in claim 3 including the steps of:
   converting the seismic energy received at each seismometer probe into radio frequency signals for transmission to a remote receiver,
   converting the radio frequency signals at the remote receiver into seimic reflection and refraction data, and
   identifying the reflection and refraction data with the seismometer probe at which it was received.

5. A method of seismic exploration, the steps comprising:
   implanting an air-droppable seismometer probe in the earth's surface,
   generating seismic waves by exploding an energy source ejected from the implanted seismometer probe,
   receiving at the seismometer probe the seismic waves generated by the explosion and reflected from subsurface strata,
   converting the seismic energy into a radio frequency signal for transmission to a remote receiver, and
   converting the radio frequency signals at the remote receiver into seismic reflection and refraction data.

6. A method of seismic exploration as set forth in claim 5 including the step of ejecting a grenade from the seismometer probe upon impact with the earth's surface.

References Cited

UNITED STATES PATENTS 3,062,315  11/1962  Herzog _____ 340—15.5
3,474,405  10/1969  Padberg _____ 340—15.5

RODNEY D. BENNETT, JR., Primary Examiner

W. T. RIFKIN, Assistant Examiner

U.S. Cl. X.R.

325—111, 115